UNITED STATES PATENT OFFICE 2,371,112

DITHIOBIURET AND METHOD OF PREPARATION

Russell L. Sperry, Stamford, Conn., assignor to American Cyanamid Company, New York, N. Y., a corporation of Maine No Drawing. Application June 29, 1943, Serial No. 492,723

6 Claims. (Cl. 260—552)

The present invention relates to dithiobiuret and to the method of preparation thereof.

I have discovered that dithiobiuret, a new chemical compound, may be prepared in good yield and of high purity by heating dicyandiamide with hydrogen sulfide under pressure in the presence of an inert solvent or diluent.

The reaction may be illustrated by the following equation:

Inert solvents or diluents which may be used in the process include, for example, water, dioxane, pyridine, methanol, ethanol, and other low molecular weight monohydric alcohols. Such liquids, in addition to being diluents, serve at least in part as solvents for the reactants, namely, the dicyandiamide and hydrogen sulfide. Ketones and aldehydes, in general, enter into the reaction with the dicyandiamide and hydrogen sulfide, and are therefore unsuitable.

In carrying out the process, a pressure vessel provided with suitable means of agitation is charged with a slurry of dicyandiamide and the solvent or diluent, and heated to a temperature within the range of 60°–115° C. Hydrogen sulfide is then passed into the vessel and a pressure of from 100 to 250 lbs. per square inch maintained throughout the run. A period of several hours is required to complete the reaction.

When using the lower temperatures and pressures in the above specified ranges, a longer time period will be required. Although temperatures and pressures somewhat below and above these ranges may be employed, the yield of dithiobiuret under such conditions may be lower and undesirable by-products formed.

After the reaction is complete, the solvent or diluent is removed, for example by evaporation or distillation to recover the same, and the residue recrystallized from hot water. The dithiobiuret thus obtained is a white needle-like crystalline material, melting at 185°–186° C., readily soluble in acetone, quite soluble in alcohols, somewhat soluble in dioxane and pyridine, and sparingly soluble in cold water.

The invention is further illustrated by the following examples:

Example I

A charge of 300 grams of dicyandiamide and 1500 cc. of ethanol was placed in an autoclave. The temperature was raised to 70°–75° C. and hydrogen sulfide passed in so as to maintain a pressure of 225–230 lbs. per square inch. After fourteen hours under these conditions, the charge was cooled and filtered. 195 grams of a yellow crystalline precipitate were obtained. Evaporation of the filtrate gave 230 grams of residue. Both products were recrystallized from hot water to yield a total of 350 grams of white needle-shaped crystals melting at 183°–184° C.

|  | Per cent C | Per cent H | Per cent N | Per cent S |
|---|---|---|---|---|
| Analysis of crystals | 18.36 | 3.61 | 30.65 | 46.85 |
| Theory for $C_2H_6N_3S_2$ | 17.77 | 3.73 | 31.11 | 47.45 |

Example II

A mixture of 200 grams of dicyandiamide and 1500 cc. of water was heated in an autoclave at a temperature of 70°–75° C. for 12 hours under a pressure of 250 lbs. per square inch of hydrogen sulfide. The charge was cooled to room temperature and filtered. The precipitate was washed with cold water and then recrystallized from hot water. 181 grams of dithiobiuret were obtained having a melting point of 185°–186° C.

Example III 100 grams of dicyandiamide and 400 cc. of dioxane were placed in an autoclave. The temperature was raised to about 100° C. and hydrogen sulfide passed in so as to maintain a pressure of 200–250 lbs. per square inch. At the end of two hours, the charge was cooled to room temperature and filtered to remove an insoluble product. The dioxane was distilled from the filtrate, and the remaining residue together with the insoluble product recrystallized from hot water. 64 grams of white needle-like crystals were obtained which melted at 183°–185° C.

Dithiobiuret is useful as a plasticizer, as an accelerator in the manufacture of rubber goods, and as an intermediate in the production of thermoplastic and water-repellent resins. It may also be used as an insecticide, and may be applied for such purpose in solution or suspension in water or in other liquid medium.

While the invention has been described with particular reference to specific embodiments, it is to be understood that it is not to be limited thereto, but is to be construed broadly and restricted solely by the scope of the appended claims.

I claim:
1. As a new compound, dithiobiuret characterized by the formula

2. A method of preparing dithiobiuret which comprises heating dicyandiamide with hydrogen sulfide under pressure in the presence of an inert solvent.

3. The method of claim 2 in which the reactants are heated together at a temperature within the range of 60° to 115° C.

4. The method of claim 2 in which the pressure is maintained within the range of 100 to 250 lbs. per square inch.

5. In a method of preparing dithiobiuret, the steps which consist in reacting dicyandiamide with hydrogen sulfide at a pressure within the range of 100 to 250 lbs. per square inch in the presence of an inert solvent and at a temperature between about 60° and 115° C. to form dithiobiuret, and separating the latter.

6. In a method of preparing dithiobiuret, the steps which consist in reacting dicyandiamide with hydrogen sulfide at a pressure within the range of 100 to 250 lbs. per square inch in the presence of an inert solvent and at a temperature between about 60° and 115° C. to form dithiobiuret, separating the latter and recrystallizing the same from water.

RUSSELL L. SPERRY.